Oct. 10, 1950 — E. L. WIEDMAN — 2,525,505
TRAILER HITCH
Filed Feb. 10, 1947
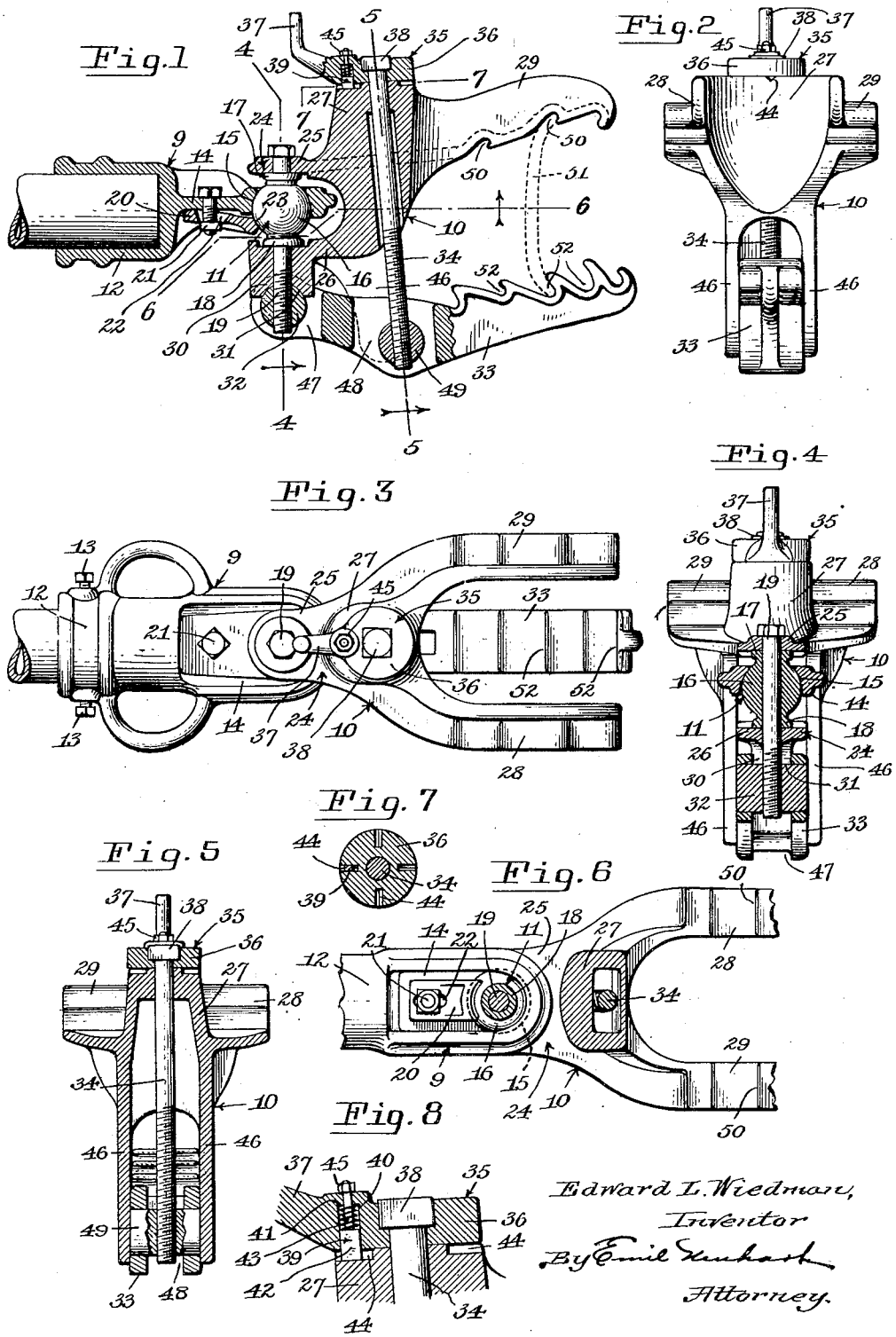

Patented Oct. 10, 1950

2,525,505

UNITED STATES PATENT OFFICE 2,525,505

TRAILER HITCH

Edward L. Wiedman, Tonawanda, N. Y.

Application February 10, 1947, Serial No. 727,715

5 Claims. (Cl. 280—33.17)

My invention relates to a trailer hitch for hitching trailers to passenger cars and similar vehicles equipped with rear bumpers.

One of the objects of my invention is to provide a hitch for trailers which can be used for attaching trailers to bumpers varying in curvature longitudinally and transversely, and in dimension transversely so that a person purchasing the hitch will have assurance it can be used in connection with any type of bumper applied to the rear of a passenger or other type of automobile.

Another object of my invention is to provide a universal joint within the structure of the hitch whereby the trailer will follow the pulling vehicle and can be easily backed up with assurance of guidance to the exact location desired.

Another object of my invention is to provide a three-pronged hitch, which I prefer to term an alligator-jaw hitch, and in such structure arrange the prongs so that two of them will engage one edge of a bumper and the third the other edge in a plane between the two first-mentioned prongs.

A further object of my invention is to provide a hitch having opposed prongs or jaws, each provided with a series of notches or teeth differently inclined so that these notches or teeth may be used selectively to receive between them and engage or accommodate any transverse contour of the bumper to which the hitch is to be secured.

A still further object of my invention is to provide means for quickly adjusting the hitch to the width of the bumper and engage the jaws or prongs therewith, and to provide means for locking the prongs or jaws in any adjusted position.

With the above and other objects in view to appear hereinafter, my invention consists in the novel feature of construction, and in the combination and arrangement of parts to be hereinafter described and more particularly pointed out in the subjoined claims.

In the drawing:

Fig. 1 is a longitudinal section of my improved trailer hitch.

Fig. 2 is a view of the attaching end of the hitch.

Fig. 3 is a top plan view of the same.

Fig. 4 is a transverse section taken on line 4—4, Fig. 1, looking in the direction of the arrow crossing said line.

Fig. 5 is a transverse section taken on line 5—5, Fig. 1, looking in the direction of the arrow crossing said line.

Fig. 6 is a horizontal section taken on line 6—6, Fig. 1, looking up.

Fig. 7 is a section taken on line 7—7, Fig. 1.

Fig. 8 is an enlarged detail sectional view of the retainer device adapted to retain the prongs or jaws of the hitch in any adjusted position.

The hitch comprises two main sections 9 and 10, connected together by a universal joint 11. I prefer to term section 9 the connector or trailer section and section 10 the attaching or hitching section. In the drawing, the connector or trailer section is provided with a socket 12 to receive a chassis or other cylindrical member of a trailer and for this purpose set screws 13 are passed through the wall of the socket to secure the connector or trailer section to the cylindrical part of the trailer. It is, however, to be understood that any other means or medium may be employed for securing the hitch to the trailer.

In the particular type of connector section illustrated, a flat-member 14 extends forwardly from the socket 12 and at its front end it has a parti-spherical opening 15 around which ribs are formed which extend upwardly and downwardly from the flat-member to provide a larger surface for the wall of said opening. Arranged in said parti-spherical opening so as to revolve therein in any direction, is a spherical member 16 having collars 17, 18 at opposite sides thereof and passing through this spherical member is a screw bolt 19, the axis of which is coincident with the axes of said spherical member and the collars formed on the latter. This screw bolt is secured to a forked or yoke-like part of the attaching section 10 in a manner to be presently described.

In order to retain the spherical member 16 in the parti-spherical opening 15, a retainer-plate 20 is secured to the underside of the flat-member 14 by means of a bolt 21 passed through the latter and through a slot 22 in said retainer-plate, a nut being applied to the lower end of said bolt and bearing against the under surface of said retainer-plate. This retainer-plate is provided with a concaved seat 23 conforming in curvature to the surface of the spherical member 16, against which it bears. The wall of the parti-spherical opening in the flat-member 14 and the concaved seat of the retainer-plate 20 form a ball socket in which the spherical member 16, or ball as it may be termed, is confined. These parts, therefore, form a universal joint between the two sections of the hitch, due to the fact that the screw bolt 19 is carried by the attaching or hitching section 10 and passes through the universal joint, the socket portion of which is carried by the connector or trailer section 9.

The attaching or hitching section has a yoke-like rear portion 24, above mentioned in a general way, the arms 25, 26 of which straddle the universal joint. The screw bolt 19 is passed through the said arms, as best shown in Figs. 1 and 4. The yoke-like rear portion 24 of the attaching or hitching section extends rearwardly from a hub-portion 27, from which extend attaching prongs or jaw members 28, 29. These prongs or jaw members are spaced apart transversely, curving laterally and forwardly from the hub-portion 27 and thence are directed forwardly in parallel relation. The yoke-like rear portion 24, the hub-portion 27 and the attaching prongs or jaw members 28 and 29 may, for convenience in further description, be referred to as the body portion of the attaching or hitching section, since the remaining portion of said section is carried thereby and movable with respect thereto, and for this purpose the arm 25 of the yoke-like portion 24 has a depending lug 30 provided with a downwardly-facing concaved seat 31 against which is seated a cylindrical member 32 into which the screw bolt 19 passing through the universal joint is threaded. This cylindrical member serves as the pivot for the movable or adjustable prong or jaw member 33 of the attaching section, as will presently appear, and for this purpose the cylindrical member extends beyond opposite side surfaces of the lug 30.

Passing vertically or substantially so through the hub-portion 27 of the attaching or hitching section 10 is a jaw-adjusting screw 34, the upper end of which projects through a combined jaw-adjusting and retaining device 35, which comprises a disk-like member 36 having a handle 37 extending therefrom for conveniently rotating said disk-like member and the jaw-adjusting screw 34 and to create this combined movement, the latter is provided with a square or other non-cylindrical head 38 which is fitted into a corresponding seat in the disk 36.

Passing through the disk 36 at one side of its axis is a retainer-latch 39 which passes through a bore 40 extending through the disk and which is counterbored to form a downwardly facing shoulder 41. The retainer-latch has an enlarged lower portion or head 42 slidable in the larger portion of the bore 40 and surrounding the latch between said head and said downwardly facing shoulder is a spiral spring 43 which tends to project the lower end of the enlargement or head of said retainer-latch beneath the under surface of the disk-like member 36. The upper end of the hub-portion 27 is provided with a circular series of notches 44, four being shown in the drawing, but any other number may be employed. Increasing numbers of said notches enable closer adjustment of the jaw-adjusting screw 34, as will be apparent from further description of this invention. The upper end of the smaller portion of the retainer-latch projects above the disk-like member 36 and has a nut 45 threaded thereon.

At the lower end of the hub-like member 27, two spaced-apart downwardly projecting guide arms 46 are provided, and arranged to move between these arms is the movable prong or jaw member 33 which is thus disposed in a vertical plane passing centrally between the attaching prongs or jaw members 28 and 29, which latter may be referred to as the fixed jaw or fixed jaw members, toward and from which the movable prong or jaw member is swung. To simplify the description, said movable prong or jaw member may be referred to as the movable jaw of the hitch.

At its rear end, the movable jaw is forked as at 47, the two arms of the fork having openings therein to fit and receive the projecting ends of the cylindrical member or pivot 32 carried by the yoke-like portion 24 through the medium of the screw bolt 19. Thus the movable jaw is pivotally secured at its rear or inner end so as to swing upwardly and downwardly between the downwardly projecting guide arms 46 of the body portion. This movable jaw is provided with an opening 48 between its ends and in the side walls of this opening a rotatable member or pivot 49 is arranged. It is so disposed with reference to the jaw-adjusting screw 34 that the lower portion of the latter is threaded therethrough and when rotating said screw in one direction the movable jaw is swung upwardly, using the cylindrical member 32 as its pivot, and when rotating said jaw-adjusting screw in an opposite direction, said movable jaw is swung downwardly. The fixed and movable jaws of the device are, therefore, relatively movable to accommodate bumpers of different widths. Formed on each of the two prongs or jaw members of the upper jaw are notches 50, which are arranged in different horizontal planes and at different inclinations and these notches are designed to receive the upper edge of a bumper, as indicated by dotted lines 51 in Fig. 1.

The notches 50 of the two fixed prongs or jaw members of the upper jaw are transversely alined so that they engage like curved portions of the bumper at opposite sides of the longitudinal center thereof. The movable or adjustable jaw 33 is provided on its upper face with notches 52, which are also in different planes and of different inclinations and these are designed to engage the lower edge of a bumper. It will, therefore, be apparent that by using a series of notches or teeth formed between notches on the fixed and movable jaws of the hitch, these notches may be selectively utilized, depending on the transverse curvature of the bumper, the longitudinal curvature of the same and the width thereof. By using three prongs or arms to engage three different points of a bumper it will be apparent that twisting strains applied to the hitch, such as may be encountered in passing over rough surfaces and traveling over roads having pronounced humps and deep depressions, detachment of the hitch from the bumper is impossible and this is particularly true because of the universal joint between the two sections of the hitch which enable the trailer to accommodate itself to the unevenness of the road while relieving strain from the attaching section of the hitch, and consequently from the pulling automobile or other vehicle.

Movement of the lower jaw is effected by grasping the handle 37 of the jaw-adjusting and retaining device and rotating the disk-like member 36 of the latter, and by reason of the connection of said member with the jaw-adjusting screw 34, the latter is rotated in the desired direction, clockwise to raise said jaw and counter-clockwise to lower the same. During the rotation of said disk-like member, the retainer-latch successively enters the notches 44 in said member and when the jaws of the hitch properly engage the bumper, said latch is retained in the notch of the series best adapted to receive it and thus lock the jaws to the bumper.

It is, of course, understood that other means for so locking the jaws of the hitch to the bumper may be employed without departing from the essence of my invention.

What I claim as my invention is:

1. A trailer hitch, comprising a connector section having a flat-member provided with a partispherical opening, an attaching section having a yoke-like rearwardly-extending portion and forwardly-extending jaw-members adapted to engage the upper marginal portion of the bumper of a pulling vehicle and having also a depending portion beneath said yoke-like portion provided with a downwardly-facing pivot seat, a pivot member entered in said pivot seat and having cylindrical projecting ends at opposite ends of said seat, a spherical member fitting into said partispherical opening, a retainer-plate fastened to said flat-member and engaging said spherical member to retain the same within said partispherical opening, a bolt passed through said yoke-like portion and said spherical member and threaded into said pivot member, and a forwardly-extending jaw member pivotally connected to projecting ends of said pivot member and adapted to engage the lower marginal portion of said bumper.

2. A trailer hitch, comprising a connector section adapted for connection to a trailer, an attaching section adapted for connection to the bumper of a pulling vehicle and a universal joint connecting said sections together, said attaching section having a vertical hub-portion, a yoke-like portion extending rearwardly from said hub-portion and having said universal joint therein, spaced-apart jaw-members extending forwardly from said hub-portion and serving as the fixed jaw of the hitch, a depending portion on said yoke-like portion, and a movable jaw pivotally attached to said depending portion, said spaced-apart jaw-members being provided with downwardly-opening notches and said movable jaw having upwardly-opening notches and an opening between its ends, a cylindrical member rotatably arranged within said opening, a jaw-adjusting screw being passed through said vertical hub-portion and threaded into said cylindrical member, and means for rotating and retaining said jaw-adjusting screw in any adjusting position.

3. A trailer hitch, comprising a connector section adapted for connection to a trailer, an attaching section adapted for connection to a part of a pulling vehicle and a universal joint connecting said sections together, said attaching section having a vertical hub portion, a yoke-like portion extending rearwardly from said hub portion and having said universal joint therein, spaced-apart jaw members extending forwardly from said hub portion and serving as the fixed jaw of the hitch, a movable jaw pivotally attached to said attaching section beneath said universal joint and having an opening between its ends extending from its upper side to its lower side, a transversely-disposed member rotatably arranged within said opening, and a jaw-adjusting screw passed through said vertical hub portion and threaded into said transversely-disposed member.

4. A trailer hitch, comprising a connector-section having a two-part socket member, an attaching section having a yoke-like rearwardly-extending portion into which said socket member extends and a forwardly extending jaw member adapted to engage the upper marginal portion of the bumper of a vehicle, said yoke-like rearwardly-extending portion having a downwardly-facing pivot seat, a transverse pivot-member entered in said pivot seat and having projecting ends, a spherical member fitted into said two-part socket member, means to secure the two-parts of said socket member together to retain said spherical member therein, means to position said spherical member in said yoke-like portion and to retain said pivot member in said pivot seat, a forwardly extending jaw member journaled on the projecting ends of said pivot member, and means to move said last-mentioned jaw member towards or from said first-mentioned jaw member.

5. A trailer hitch, comprising a connector-section having a two-part socket member, an attaching section having a yoke-like rearwardly-extending portion provided with vertically spaced-apart arms between which said yoke-like portion is disposed and a forwardly-extending jaw member adapted to engage the upper marginal portion of the bumper of a vehicle, the lower of said spaced-apart arms having a downwardly-facing pivot seat in its underside, a transverse pivot-member entered in said pivot seat and having projecting ends, a spherical member fitted between the two-parts of said socket member, means to secure the two-parts of said socket member together to retain said spherical member therein, a screw bolt passed vertically through said spaced-apart arms, said spherical member and said two-part socket member and threaded through said pivot-member, a forwardly extending jaw member journaled on the projecting ends of said pivot-member, and means to move said last-mentioned jaw member towards and from said first-mentioned jaw member.

EDWARD L. WIEDMAN.

REFERENCES CITED

The following references are of record in the file of this patent:

UNITED STATES PATENTS

| Number | Name | Date |
| --- | --- | --- |
| 2,088,153 | Draeger | July 27, 1937 |
| 2,118,231 | Ricker | May 24, 1938 |
| 2,250,661 | Thorp et al. | July 29, 1941 |
| 2,347,081 | Caton | Apr. 18, 1944 |
| 2,432,249 | Pearson | Dec. 9, 1947 |
| 2,440,877 | Russell | May 4, 1948 |